United States Patent [19]

Steiner et al.

[11] Patent Number: 5,207,925

[45] Date of Patent: * May 4, 1993

[54] PROCESS FOR THE DETOXIFICATION OF CYANIDE-CONTAINING AQUEOUS SOLUTIONS

[75] Inventors: Norbert Steiner, Albstadt; Stephen Gos, Hanau; Frank Ladwig, Gruendau; Manfred Diehl, Frankfurt, all of Fed. Rep. of Germany

[73] Assignee: Degussa Aktiengesellschaft, Frankfurt am Main, Fed. Rep. of Germany

[*] Notice: The portion of the term of this patent subsequent to Apr. 20, 2010 has been disclaimed.

[21] Appl. No.: 857,414

[22] Filed: Mar. 26, 1992

[30] Foreign Application Priority Data

Mar. 27, 1991 [DE] Fed. Rep. of Germany ....... 4110055

[51] Int. Cl.$^5$ ............................................... C02F 1/72
[52] U.S. Cl. .................................... 210/746; 210/759; 210/763; 210/904
[58] Field of Search ............... 210/717, 759, 763, 912, 210/904, 746; 423/582, 583, 584, 586, 281

[56] References Cited

U.S. PATENT DOCUMENTS

| T102,905 | 4/1983 | Kibbel, Jr. ......................... 210/759 |
| 2,533,660 | 12/1950 | Young ................................. 423/583 |
| 3,510,424 | 5/1970 | Zumbrunn et al. ................. 210/759 |
| 3,617,567 | 11/1971 | Mathre ................................ 210/737 |
| 3,617,582 | 11/1971 | Lawes et al. ....................... 210/759 |
| 3,715,309 | 2/1973 | Lumbrunn et al. ................. 210/759 |
| 3,843,516 | 10/1974 | Yamada et al. ..................... 210/759 |
| 3,970,554 | 7/1976 | Fischer et al. ..................... 210/759 |
| 4,594,170 | 6/1986 | Brown et al. ....................... 210/759 |
| 5,094,827 | 3/1992 | Bertsch-Frank et al. ........... 423/279 |

FOREIGN PATENT DOCUMENTS 2352856 4/1975 Fed. Rep. of Germany .
94739 10/1969 France .

OTHER PUBLICATIONS

Gmelin Handbook of Inorganic Chemistry, 8th Edition, 3rd Supplement, 8th Edition, vol. 2, 1987, pp. 177-179
European Search Report.

Primary Examiner—Stanley S. Silverman
Assistant Examiner—Neil M. McCarthy
Attorney, Agent, or Firm—Beveridge, DeGrandi, Weilacher & Young

[57] ABSTRACT

A process is disclosed for the detoxification of aqueous solutions containing cyanides and/or cyano complexes in the presence of heavy metals which are Mn, Co, Ni, Cu, Cd and Zn, more particularly Cu, by oxidative treatment of the solutions with peroxide compounds at pH values of 8 to 12. Peroxide compounds from the group consisting of alkali metal percarbonates and alkaline earth metal peroxides are used. The peroxide compounds are added to the solutions to be detoxified per se or are formed in situ therein from hydrogen peroxide and other components. Sodium perborate, sodium percarbonate and calcium peroxide are preferred.

20 Claims, No Drawings

PROCESS FOR THE DETOXIFICATION OF CYANIDE-CONTAINING AQUEOUS SOLUTIONS

BACKGROUND OF THE INVENTION

This invention relates to a process for the detoxification of aqueous solutions containing cyanides and/or cyano complexes in the presence of heavy metals selected from the group consisting of Mn, Co, Ni, Cu, Cd and Zn, more particularly copper, by oxidative treatment thereof with peroxide compounds.

Wastewaters containing cyanides and/or cyanohydrins can be detoxified by the process according to U.S. Pat. No. 3,970,554 in which peroxide compounds are added at temperatures of 10° to 80° C. and at pH values of 6 to 12 in the presence of iodide ions as catalyst and, optionally, silver ions. Hydrogen peroxide is said to be the preferred peroxide compound although alkali metal and alkaline earth metal peroxides may be used in the same way. Although perborates, percarbonates and persulfates are also described as effective in this document, comparison of test 10 (Example 2) with test 25 (Example 7) demonstrates the superiority of hydrogen peroxide to sodium perborate because the reaction time required to reduce the cyanide content to below 0.1 mg/ml was three times longer in the case of the perborate.

According to U.S. Pat. No. 3,970,554, the detoxification of cyanides with hydrogen peroxide proceeds unsatisfactorily in the absence of catalysts. On the other hand, the known copper catalysts have the disadvantage that precisely when the last trace of cyanide is to be decomposed, the decomposition of hydrogen peroxide is also intensively catalyzed. Accordingly, an adequate degree of detoxification is often not achieved.

In the course of the reaction, poorly soluble CuCN; is formed from the copper cyano complexes through step-by-step degradation; if the CuCN is completely degraded by an excess of $H_2O_2$, the copper tetrammine complex is formed, preventing precipitation of the copper ion hydroxide form. Accordingly, the treated wastewater may also contain an undesirably large residual quantity of Cu ions.

The problems referred to increase in significance particularly when, in the interests of sufficiently rapid detoxification, a large amount of copper is added to the wastewater to be detoxified, so that copper cyano complexes are initially formed, or when the wastewater-because of its origin-already contains a relatively large quantity of copper cyano complexes and, optionally, other heavy metal cyano complexes, such as those of Cd, Ni, Co, Zn. The process according to U.S. Pat. No. 3,970,554 was intended for the detoxification of wastewaters which are free from heavy metal cyanides and/or do not require the addition of copper salts as a catalyst; only the addition of at most 1 mg $Ag^+/l$ as catalyst and, hence, the presence of an equivalent quantity of the $Ag(CN)_2^-$ complex was regarded as appropriate.

Solids-free or solids-containing wastewaters, for example ore suspensions of the type accumulating in the mining industry, for example in the leaching of gold with cyanide, and in the electroplating industry, contain heavy metal cyano complexes, particularly copper cyano complexes, in significant quantities. Wastewaters such as these cannot be satisfactorily detoxified with hydrogen peroxide and/or the necessary molar ratio of $H_2O_2$ to cyanide is so high that economy is totally jeopardized.

According to U.S. Pat. No. 3,510,424, the oxidation of cyanide to cyanate with subsequent hydrolysis of the cyanate can be carried out with peroxo acids or salts thereof instead of hydrogen peroxide. The oxidation reaction proceeds more quickly with peroxo monosulfate, for example, than with $H_2O_2$ and can be further accelerated by catalysts, such as copper salts. In general, the cyanide content of aqueous solutions containing heavy metal cyano complexes can be sufficiently reduced by this process. However, the economy of the process using peroxo acids is limited by their much higher market price compared with hydrogen peroxide.

According to EP-A 0 355 417, special oxidation mixtures of hydrogen peroxide and sulfuric acid may be used instead of commercially available peroxomonosulfates for the detoxification of cyanides, so that the quantity of $H_2O_2$ used can be reduced. Oxidation mixtures of hydrogen peroxide and phosphoric acid have also been proposed (EP-A-0 398 234). However, the use of mineral acid in areas where cyanide-containing wastewaters accumulate or are detoxified involves the risk that mineral acid can enter the cyanide solution in the event of a malfunction so that hydrogen cyanide escapes and environmental safety is put at risk. In addition, the production of the oxidation mixtures mentioned requires a dissolving station, and optionally, a cooling system.

Finally, the quantity of hydrogen peroxide used in cyanide detoxification can also be reduced in accordance with EP-A-0 355 418, although a special precipitant for heavy metals, namely trimercapto-s-triazine, does have to be used for this purpose.

It is known from practice that the detoxification of cyanide-containing wastewaters with peroxide compounds proceeds unsatisfactorily and/or leads to an extremely high consumption of peroxide compounds particularly when manganese is present in the wastewater.

Although, as explained above, there are various known processes for the detoxifaction of aqueous solutions containing cyanides and/or cyano complexes of toxic heavy metals, there is still a need to broaden the possibilities for detoxification using peroxide compounds to enable various parameters to be taken into account in practice.

SUMMARY OF THE INVENTION

An object of the invention is to increase the effectiveness and/or economy of the process including an increase in the degree of detoxification in respect of the residual cyanide and residual heavy metal content; shortening of the reaction time and reduction of the quantity of peroxide compound used by comparison with the use of $H_2O_2$ in the presence of typical catalysts; the use of adequately available peroxide compounds which, related to one peroxide equivalent, are less expensive than commerically available peroxomonosulfates. Finally, another object of the invention is to design the process in such a way that manganese-containing aqueous solutions containing cyanides and/or cyano complexes can also be detoxified in the presence of heavy metals selected from the group consisting of Cu, Cd, Ni, Co and Zn, more particularly Cu, more safely and with less consumption of peroxide compounds than has hitherto been possible.

Accordingly, the present invention provides a process for the detoxification of cyanide- and/or cyano complex-containing aqueous solutions, which may also containing solids, herein referred to as wastewaters, in the presence of one or more compounds of heavy metals selected from the group consisting of Mn, Co, Ni, Cu, Cd and Zn, more particularly Cu, by oxidative treatment of the solutions with peroxide compounds whereby in carrying out the process at least one equivalent of peroxide compound is used per equivalent of cyanide, at pH values of 8 to 12 and at temperatures between the freezing point of the solutions and 80° C., wherein one or more peroxide compounds from the group consisting of alkali metal and alkaline earth metal perborates, alkali percarbonates and alkaline earth metal peroxides are used. The peroxide compounds can be added to the solution to be detoxified in solid form or in solution or suspension in water. They can also be formed in situ therein from hydrogen peroxide and the other components from the group selected from the metaborate, alkali metal and alkaline earth metal ions.

DETAILED DESCRIPTION OF THE PREFERRED EMBODIMENTS

In the context of the invention, cyano complexes are understood in particular to be those of the toxic heavy metals copper, zinc, cadmium, nickel and cobalt. The solutions to be detoxified preferably contain copper which is either already present in the solution—in the form of copper cyano complexes—from its origin or has been added as an effective catalyst to the solution to be detoxified in the form of a Cu compound, more particularly a soluble Cu(II) salt. The concentration of heavy metals already present in and added to the solution to be detoxified is typically more than 1 mg/l before addition of the peroxide compound.

It is possible by the process according to the invention—using added or "in situ" formed perborate or alkaline earth metal peroxide or added alkali metal percarbonate—economically to detoxify cyanide-containing solutions in the presence of copper to a residual content of less than 1 mg CN/l and less than 1 mg Cu/l. Surprisingly, this also applies to solutions which contain manganese. Neither was it foreseeable that the nickel content of nickel-containing cyanide solutions could be further reduced by the process according to the invention to a value below that obtained when using $H_2O_2$ or peroxo monosulfate.

In view of the results obtained with perborate by comparison with hydrogen peroxide in the process according to U.S. Pat. No. 3,970,554 previously discussed, it was surprising to find that, in the presence of copper as catalyst, perborate allows a significant reduction in the quantity used (equivalents of peroxide compound per equivalent of cyanide) and leads to a shortening of the detoxification reaction. The quantity of perborate used is also considerably reduced in relation to peroxo monosulfate, as follows from the detoxification of wastewaters from the electroplating industry. The outstanding effect which perborates have now been found to exhibit had also not been expected in the light of the known purification of sulfide-containing wastewaters using peroxide compounds from the group consisting of $H_2O_2$, percarbonate, peroxomonosulfate, peroxodisulfate and perborate (cf. Table 13 of DE-OS 23 36 966). Although DE-OS 23 36 993 mentions a shortening in the reaction time when percarbonate is used, it does not impart the teaching that the residual content of wastewater pollutants could be significantly reduced by using percarbonate.

Among the perborates, alkali metal perborates, such as sodium perborate, particularly in the form of the so-called monohydrate ($NaBO_3.H_2O$) and the tetrahydrate ($NaBO_3. 4H_2O$), potassium perborate hydrate ($KBO_3.nH_2O$ with $n=0.2$ to 1) and so-called superoxidized sodium perborate containing more than 16% of active oxygen, and also alkaline earth metal perborates, more particularly magnesium and calcium perborate, may be used in the process according to the invention. These perborates may be added in solid form or in solution or suspension in water or are formed in situ in the solution to be detoxified from added hydrogen peroxide and a source for metaborate and alkali metal or alkaline earth metal ions, more particularly $NaBO_2$, $Na_2B_4O_7$, $Ca(BO_2)_2$ or boric acid and NaOH or $Ca(OH)_2$. $H_2O_2$ and the source for borate may be added in stoichiometric quantities for the in situ formation of the perborate. Alternatively, the molar ratio of borate, expressed as $BO_2^-$, to hydrogen peroxide may be reduced to values below 1 provided that the entire amount of the source for borate and, if necessary, the source for alkali metal or alkaline earth metal ions are added to the solution to be detoxified at the beginning and $H_2O_2$ is subsequently added in one or more portions during the detoxification reaction. A molar ratio of borate, expressed as $BO_2^-$, to $H_2O_2$ of 1:2 to 4 is preferred.

Where alkaline earth metal peroxides are used as peroxide compound, they may be added in solid form or may be formed in situ from $H_2O_2$ and a source for alkaline earth metal ions, such as oxides, hydroxides and chlorides thereof, in the same way as the perborates. Among the alkaline earth metal peroxides, magnesium peroxide is preferred and calcium peroxide particularly preferred. Where the alkaline earth peroxides are formed in situ, the source for alkaline earth metal ions (expressed as $Me^{2+}$) and $H_2O_2$ are used in a molar ratio of 1:1 or 1:>1; a molar ratio of 1:>1 and, more particularly, 1:2 to 3 is appropriate particularly when $H_2O_2$ is added in several portions or continuously to a cyanide solution containing a sufficient amount of Ca ions in the course of the detoxification process.

Alkali metal percarbonates, particularly sodium percarbonate $Na_2CO_3.1.5 H_2O_2$, are also suitable as peroxide compound in the process according to the invention. With sodium percarbonate, detoxification can readily be achieved to residual cyanide contents below 1 mg/l. In a particularly preferred embodiment, the percarbonate is added in solid form to the solution to be detoxification because distinctly better detoxification results are obtained with solid percarbonate than with a percarbonate solution.

The solutions to be detoxified, which may also contain solids, are generally wastewaters of varying provenance, for example from the mining industry, the chemical industry, electroplating factories and washing waters of incineration plants or blast furnace processes. The wastewaters from the mining industry may be, for example, wastewaters and tailings (ore suspension) from processes for the recovery of gold by cyanide leaching. Wastewaters and tailings such as these often contain copper cyano amount complexes in large amount and, in some cases, also nickel and other heavy metals. Cyanide-containing wastewaters having a more or less broad spectrum of cyano complex-forming heavy metals from the group selected from Mn, Co, Ni, Cu, Zn and Cd often accumulate in metallization processes involving standard electroplating techniques and, more often than not, contain copper and also nickel and, in some cases manganese.

In the oxidative treatment of the solutions to be detoxified with peroxide compounds, free cyanide and cyanide bound as cyano complex is first oxidized to cyanate which is then hydrolyzed to $NH_4^+$ and $HCO_3^-$. It is known that the oxidization of the cyanide is effectively catalytically accelerated by heavy metal cations, such as in particular Cu(II), Co(II) and Ni(II). In practice, use is often made in particular of the addition of Cu(II) as a catalyst to obtain the required residual cyanide content in an acceptable reaction time.

The overstoichiometric consumption of peroxide compound is attributable inter alia to its decomposition which is characterized by the same metals that catalyze oxidation of the cyanide. Another factor to be taken into consideration is that, in addition to hydrolysis, cyanate also undergoes peroxolysis ($OCN + 2 H_2O_2 \rightarrow NH_3 + HCO_3^- + O_2$). According to the invention, at least two equivalents of peroxide compound (i.e. at least 2 moles in the case of sodium perborate tetrahydrate and at least 4/3 moles in the case of sodium percarbonate) are used per equivalent of cyanide. 2 to 4 equivalents or peroxide compound are preferably used per cyanide group. The quantity of peroxide compound used may have to be further increased, particularly for the detoxification of electroplating wastewaters of complex composition.

It has also been found that the entire quantity of peroxide compound does not have to be used in the form of a perborate added or formed in situ. By using a combination of a perborate, more particularly alkali metal perborate, and hydrogen peroxide under the same ratio of cyanide to peroxide compound the economy of the process can be increased because $H_2O_2$, as a perborate precursor, is of course less expensive. In addition, a reduced consumption of borate is another advantage. A molar ratio of alkali metal perborate, more particularly sodium perborate monohydrate or tetrahydrate, to hydrogen peroxide of 1:3 to 3:1 has proved to be favorable. Attention has already been drawn to the possible substoichiometric use of alkaline earth metal ions relative to $H_2O_2$ where alkaline earth metal peroxides are used.

The detoxification reaction may be carried out at temperatures between above the freezing point of the solution to 80° C. Although higher temperatures are possible, they are generally not advisable on economic reasons. Temperatures in the range from 10° to 50° C. are preferred, those in the range from 15° to 30° C. being particularly preferred. The pH value during the detoxification reaction should be between 8 and 12, preferably between 9.5 and 11.5 and, more preferably, between 10 and 11. The pH value is best maintained within the preferred ranges during the detoxification reaction or in several portions or continuously during the detoxification reaction.

The detoxification reaction may also be carried out in the presence of iodide as catalyst. In this case, the end of the detoxification reaction is preferably indicated potentiometrically in the presence of 1 to 1,000 μg $Ag^+/l$ by means of a pair of silver/thalamid electrodes.

The advantages of the process according to the invention are that the equivalent ratio of peroxide compound to cyanide can be considerably reduced in relation to hydrogen peroxide:cyanide and even peroxomonosulfate:cyanide for the detoxification of cyanide solutions containing metals which form cyano complexes. At the same time, the degree of detoxification in respect of the heavy metals, such as copper in particular, but also nickel, can be improved. Accordingly, it is now also possible, by addition of Cu(II) compounds as catalyst, to detoxify effectively and rapidly even those cyanide-containing wastewaters where, hitherto, it has not been the practice to add Cu(II) in order to avoid an excessive residual Cu content. It is particularly significant that manganese-containing cyanide solutions can now also be economically detoxified.

EXAMPLE 1

Detoxification of an aqueous solution containing 100 ppm of readily releasable cyanide ($CN_{WAD}$) and 60 ppm of Cu using sodium perborate tetrahydrate (Pbth) by comparison with $H_2O_2$.

The solution was prepared by dissolving sodium cyanide and $CuSO_4.5H_2O$ in water. The pH value was adjusted to 10 with NaOH before detoxification. Detoxification was carried out at room temperature. Table 1 shows the selected molar ratios of $H_2O_2$ to $CN_{WAD}$ (prior art) and $NaBO_3.4H_2O_2$ (Pbth) to $CN_{WAD}$ (invention) and also the detoxification results depending upon the quantity of peroxide compound used, the pH values and the reaction times. $H_2O_2$ was added in the form of a 70% by weight aqueous solution while sodium perborate tetrahydrate was added in solid form (powder). For the potentiometric end point indication using a pair of silver/thalamid electrodes, the detoxification reaction was carried out in the presence of 0.1 ml Aktivator CN (a product of Degussa AG) per liter solution. The Cu content was determined by atomic absorption spectra while the cyanide content was determined photometrically by the picric acid method.

Whereas, in the case of $H_2O_2$, a quantity of more than 6 moles of $H_2O_2$ per CN group was required for detoxification to a residual cyanide content below 0.5 ppm and a residual Cu content of below 1 ppm, the same result was achieved in the case of Pbth with a quantity of only 3 moles of Pbth per CN group.

TABLE 1

| | Residual concentration after detoxification | | pH before → after detoxification | Reaction time (mins.) |
|---|---|---|---|---|
| | [$CN_{WAD}$] (ppm) | [Cu] (ppm) | | |
| Molar ratio [$H_2O_2$]:[$CN_{WAD}$] | | | | |
| 1:1 | 37.8 | 47.3 | 10 const. | 60 |
| 2:1 | 18.1 | 22.6 | 10 const. | 23 |
| 3:1 | 16.64 | 20 | 10 const. | 14 |
| 4:1 | 13.12 | 15.2 | 10 const. | 10 |
| 6:1 | 4.32 | 15.2 | 10 const. | 7 |
| 8:1 | 0.02 | <1.0 | 10 const. | 2 |
| Molar ratio [Pbth]:[$CN_{WAD}$] | | | | |
| 1:1 | 35.53 | 40.9 | 10 → 10.3 | 25 |
| 2:1 | 3.93 | 3.67 | 10 → 10.4 | 9 |
| 3:1 | 0.36 | 0.08 | 10 → 10.7 | 7 |
| 4:1 | 0.21 | <0.07 | 10 → 10.9 | 5 |

EXAMPLE 2

Detoxification of an aqueous solution containing 199 ppm of readily releasable cyanide ($CN_{WAD}$), 60 ppm of Cu and, additionally, 2 ppm of Mn(II) (added as $MnSO_4 \rightarrow H_2O$).

The detoxification conditions correspond to those of Example 1. Table 2 shows the results obtained—again in the form of a comparison of $H_2O_2$ with Pbth. In this case, too, the quantity of peroxide compound added in mole per CN group was reduced to about half in the case of Pbth compared with $H_2O_2$.

TABLE 2

| Molar ratio $[H_2O_2]:[CN_{WAD}]$ | Residual concentration after detoxification | | pH before → after detoxification | Reaction time (mins.) |
|---|---|---|---|---|
| | $[CN_{WAD}]$ (ppm) | [Cu] (ppm) | | |
| 2:1 | 75.65 | 59.4 | 10 → 10.7 | 60 |
| 4:1 | 35 | 39 | 10 → 11 | 17 |
| 6:1 | 9.76 | 10.98 | 10 → 10.8 | 8 |
| 8:1 | 0.04 | 0.48 | 10 → 11.3 | 6 |
| Molar ratio $[Pbth]:[CN_{WAD}]$ | | | | |
| 1:1 | 82.31 | 60.9 | 10 → 10.5 | 60 |
| 2:1 | 48.3 | 56.25 | 10.3 → 10.6 | 30 |
| 3:1 | 7 | 7.2 | 10 → 10.4 | 9 |
| 4:1 | 0.31 | 0.06 | 10 → 10.3 | 5 |

EXAMPLE 3

The cyanide-containing solution of Example 1 was detoxified at a constant molar ratio of peroxide compound to cyanide$_{WAD}$ of 3, combinations of $H_2O_2$ and sodium perborate tetrahydrate (Pbth) also being used. Test conditions as in Example 1. The results are set out in Table 3. It can be seen that an excellent detoxification result was obtained with a molar ratio of $H_2O_2$ to Pbth of, for example, 2:1.

TABLE 3

| Molar ratio $[H_2O_2]:[CN_{WAD}]$ | Residual concentration after detoxification | | pH before → after detoxification | Reaction time (mins.) |
|---|---|---|---|---|
| | $[CN_{WAD}]$ (ppm) | [Cu] (ppm) | | |
| 3:0 | 16.64 | 20 | 10 const. | 14 |
| 2.5:0.5 | 1.14 | 1.25 | 10 const. | 7 |
| 2:1 | 0.41 | 0.23 | 10 const. | 5.7 |
| 1.5:1.5 | 0.36 | 0.18 | 10 → 10.3 | 5.5 |
| 1:2 | 0.25 | 0.25 | 10 → 10.5 | 5.5 |
| 0:3 | 0.36 | 0.08 | 10 → 10.7 | 7 |

EXAMPLE 4

The manganese-containing cyanide solution of Example 2 was detoxified with combinations of $H_2O_2$ and Pbth at a constant molar ratio of peroxide compound to cyanide$_{WAD}$ of 4:1. The results are set out in Table 4. Whereas a totally inadequate detoxification result both in regard to the residual CN content and in regard to the residual Cu content was obtained with $H_2O_2$ per se, substantially the same satisfactory detoxification result was achieved with the combination $H_2O_2$/Pbth (=2:2) as with perborate alone.

TABLE 4

| Molar ratio $[H_2O_2]:[CN_{WAD}]$ | Residual concentration after detoxification | | pH before → after detoxification | Reaction time (mins.) |
|---|---|---|---|---|
| | $[CN_{WAD}]$ (ppm) | [Cu] (ppm) | | |
| 4:0 | 35 | 39 | 10 → 11 | 17 |
| 3:1 | 9.84 | 10 | 10 → 10.8 | 8 |
| 2:2 | 0.35 | <0.06 | 10 → 10.75 | 8 |
| 1:3 | 0.31 | 0.31 | 10 → 10.7 | 6 |
| 0:4 | 0.31 | 0.06 | 10 → 10.3 | 5 |

EXAMPLE 5

The cyanide solution of Example 1 containing 100 ppm $CN_{WAD}$ and 60 ppm Cu was detoxified using perborate formed in situ. Boric acid was sued as the borate source. Table 5 shows the detoxification results of test with $H_2O_2$ per se (Example 5a), with the combinations $H_2O_2$/$NaBO_3.4H_2O$ (Example 5b) and $H_2O_2$/$H_3BO_3$ (Example 5c); $H_2O_2$ and perborate or the borate source were added to the solutions to be detoxified at the start and the pH value was adjusted to 11 and kept constant during the detoxification reaction.

TABLE 5

| Example | Addition | Molar ratios | Residual concentrations | | Reaction time (mins.) |
|---|---|---|---|---|---|
| | | | $CN_{WAD}$ (ppm) | Cu (ppm) | |
| 5a | $H_2O_2$ | $H_2O_2:CN_{WAD}$ = 3:1 | 15.3 | 50.4 | 12 |
| 5b | $H_2O_2$ | $H_2O_2:CN_{WAD}$ = 2:1 | 7.1 | 7.2 | 8 |
| | $NaBO_3$ $4H_2O$ (=Pbth) | $Pbth:CN_{WAD}$ = 1:1 | | | |
| 5c | $H_2O_2$ | $H_2O_2:CN_{WAD}$ = 3:1 | 7.0 | 7.8 | 6 |
| | $H_3BO_3$ | $H_3BO_3:CN_{WAD}$ = 1:1 | | | |

Comparison of Examples 5b and 5c shows that added perborate and perborate formed in situ produce substantially the same result. It is to be noted that the higher residual concentrations in Example 5b compared with Example 3 with a molar ratio of $H_2O_2$ to Pbth of 2:1 are attributable to the different pH values.

EXAMPLE 6

Wastewater from a gold mine was detoxified. The wastewater contained 145 ppm of $CN_{WAD}$, 118.7 ppm of Cu, 62.2 ppm of Fe, 0.7 ppm of Ni and 355 ppm of SCN and had a pH value of 8.45. Detoxification was carried out with $H_2O_2$ (Example 6a), $H_2O_2$/$NaBO_3.4H_2O$ (Pbth) Example 6b) and $H_2O_2$/$Na_2B_4O_7$ (Example 6c) at a constant pH value of 11 and at a temperature of 20° C. The peroxide compounds were added at the beginning of the detoxification reaction. In Example 6c, borax was added prior to the addition of $H_2O_2$. The results are set out in Table 6 below.

TABLE 6

| Example | Addition | Molar ratios | Residual concentrations | |
|---|---|---|---|---|
| | | | $CN_{WAD}$ (ppm) | Cu (ppm) |
| 6a | $H_2O_2$ | $H_2O_2:CN_{WAD}$ = 4:1 | 2.32 | 0.884 |
| 5b | $H_2O_2$ | $H_2O_2:CN_{WAD}$ = 3:1 | 0.75 | 0.45 |
| | Pbth | $Pbth:CN_{WAD}$ = 1:1 | | |
| 5c | $H_2O_2$ | $H_2O_2:CN_{WAD}$ = 4:1 | 0.53 | 0.34 |
| | $Na_2B_4O_7$ | $Na_2B_4O_7:CN_{WAD}$ = 0.25:1 | | |

EXAMPLE 7

A cyanide-containing aqueous solution contained:

Directly measurable cyanide     9.6 mg/l

-continued

| | |
|---|---|
| Total cyanide*) | 20.8 mg/l |
| Readily releasable cyanide*) | 20.7 mg/l |
| Nickel | 10.7 mg/l |

*)Determined in accordance with DIN 38405 D13.1 and D13.2.

In Example 7a, detoxification was carried out by using hydrogen peroxide and triple salt $2KHSO_5 \cdot KHSO_4 \cdot K_2SO_4$ (active oxygen content $O_a=4.7\%$) and, in Example 7b, using $H_2O_2$ and sodium perborate tetrahydrate ($O_a=10.2\%$). Detoxification was carried out at 20° C. and at a constant pH 10.5 in the presence of 0.1 ml Aktivator CN (Degussa AG) per 1 solution and the course of the detoxification reaction was followed potentiometrically using a pair of silver/thalamid electrodes. Initially, the solution to be detoxified was treated with $H_2O_2$ in portions until the $H_2O_2$ decomposed. Following an after-reaction time of 30 minutes, the $KHSO_5$-containing triple salt and the perborate, respectively, were added in portions with potentiometric indication—again until the peroxide compound decomposed. The total quantities of peroxide compounds consumed and the detoxification results are set out in Table 7 below.

TABLE 7

| Example | | 7a | 7b |
|---|---|---|---|
| Directly measurable cyanide | (mg/l) | <0.1 | <0.1 |
| Total cyanide | (mg/l) | <0.2 | <0.2 |
| Readily releasable cyanide | (mg/l) | <0.2 | <0.2 |
| Nickel | (mg/l) | 9.0 | 3.6 |
| Consumption of $H_2O_2$ (50% by weight) | (mg/l) | 836 | 836 |
| Consumption of triple salt | (mg/l) | 6000 | |
| | (mgO$_a$/l) | 282 | |
| Consumption of perborate | (mg/l) | | 1200 |
| | (mgO$_a$/l) | | 122 |

The much lower consumption of active oxygen ($O_a$) per liter solution in Example 7b according to the invention demonstrates the superiority of perborate over peroxomonosulfate.

EXAMPLE 8

An aqueous solution containing 100 ppm readily releasable cyanide and 60 ppm Cu was detoxified by using sodium percarbonate ($NaCO_3 \cdot 1.5\ H_2O_2$). The detoxification reaction was carried out at a constant pH value of 10 and at a temperature of 20° C. NaOH and HCl were used for adjusting and correcting the pH value. Sodium percarbonate was introduced in solid form into the solution adjusted to pH 10 in a single portion at the start of the reaction. The end point indication and the analyses were carried out as in Example 1. Table 8 shows the results obtained by comparison with hydrogen peroxide.

TABLE 8

| Peroxide compound | Equivalent ratio [peroxide compound]: [CN$_{WAD}$] | Residual concentration [CN$_{WAD}$] (ppm) | [Cu] (ppm) | Reaction time (mins.) |
|---|---|---|---|---|
| $Na_2CO_3$ 1.5 $H_2O_2$ | 3:1*) | 0.39 | 0.5 | 14 |
| $H_2O_2$ | 3:1**) | 16.64 | 20 | 14 |

*)Molar ratio [sodium percarbonate]:[CN$_{WAD}$] = 2:1
**)See comparison tests in Example 1

EXAMPLE 9

A solution containing 100 ppm of $CN_{WAD}$ and 60 ppm of Cu was detoxified using calcium peroxide formed in situ at a constant pH value of 10 (adjustment/correction with NaOH and HCl). Aqueous hydrogen peroxide solution (70% by weight) was added in a single portion to the aqueous solution to which calcium oxide had first been added. The end point indication and analyses were carried out as in Example 1. Table 9 shows the results obtained by comparison with hydrogen peroxide in the absence of Ca ions.

TABLE 9

| Addition | Molar ratios | Residual concentration [CN$_{WAD}$] (ppm) | [Cu] (ppm) | Reaction time (mins.) |
|---|---|---|---|---|
| CaO and $H_2O_2$ | [CaO]:[H$_2$O$_2$] = 1:1 [H$_2$O$_2$]:[CN$_{WAD}$] = 4:1 | <0.1 | 0.14 | 8 |
| $H_2O_2$ | [H$_2$O$_2$]:[CN$_{WAD}$] 4:1*) | 13.12 | 15.2 | 10 |

*)See comparison tests in Example 1

Further modifications and variations of the foregoing will be apparent to those skilled in the art and are intended to be encompassed by the claims appended hereto.

German priority application P 41 10 055.7 is relied on and incorporated herein by reference.

We claim:

1. A process for the detoxification of cyanide-and/or cyano complex-containing wastewater, in the presence of a compound of a heavy metal from the group consisting of Mn, Co, Ni, Cu, Cd and Zn, comprising treating said wastewater with at least one peroxide compound, at least one equivalent of peroxide compound being used per equivalent of cyanide in said wastewater, at a pH value of 8 to 12 and at a temperature between the freezing point of the wastewater and 80° C., wherein one or more peroxide compounds from the group consisting of alkali metal and alkaline earth metal perborates, alkali percarbonates and alkaline earth metal peroxides is used, the peroxide compound being added to said wastewater to be detoxified in solid form or in solution or suspension in water or being formed in situ therein from hydrogen peroxide and a member of the group consisting of the metaborate, the alkali metal and the alkaline earth metal ions.

2. The process according to claim 1 wherein the wastewater is an aqueous solution.

3. The process according to claim 1 wherein the wastewater contains waste solids.

4. The process according to claim 1 wherein a compound of Cu is present in the waste water.

5. The process according to claim 1, wherein 2 to 4 equivalents of peroxide compound are used per equivalent of cyanide.

6. The process according to claim 1, wherein an alkali metal perborate, and in addition hydrogen peroxide are used as said peroxide compounds.

7. The process according to claim 6 wherein said alkali metal perborate is sodium perborate.

8. The process according to claim 6, wherein the alkali metal perborate and the hydrogen peroxide are used in a molar ratio of 1:3 to 3:1.

9. The process according to claim 1, wherein a source for metaborate and hydrogen peroxide in an equivalent ratio of boron to hydrogen peroxide of 1:>1 are added for the in situ formation of the perborate, wherein the source for perborate and, optionally, the source for alkali metal or alkaline earth metal ions being added first and the hydrogen peroxide being subsequently added in one or more portions.

10. The process according to claim 9 wherein said ratio is 1:2–4.

11. The process according to claim 1, wherein sodium percarbonate corresponding to the formula $Na_2CO_3 \cdot 1.5 \, H_2O_2$ is added as the peroxide compound.

12. The process according to claim 11 wherein the sodium percarbonate is added to the solution to be detoxified in solid form in one or more portions.

13. The process according to claim 1, wherein calcium peroxide is added.

14. The process according to claim 13 wherein said calcium peroxide is formed in situ from hydrogen peroxide and a source for calcium ions.

15. The process according to claim 14 wherein said source of calcium ions is CaO or $Ca(OH)_2$.

16. The process according to claim 1, wherein the pH value is kept between 9.5 and 11.5 during the detoxification reaction.

17. The process according to claim 15 wherein said pH value is between 10 and 11.

18. The process according to claim 1, wherein the detoxification reaction is carried out in the presence of iodide and the end of the detoxification reaction is indicated potentiometrically in the presence of 1 to 1,000 µg $Ag+/l$ by means of a pair of silver/thalamid electrodes.

19. The process according to claim 1, wherein manganese-containing aqueous solutions containing cyanides and/or cyano complexes are detoxified in the presence of copper as catalyst.

20. Process according to claim 14, wherein the molar ratio of calcium ion source: hydrogen peroxide=1:>1.

* * * * *